United States Patent [19]
Aftanas

[11] Patent Number: 6,105,841
[45] Date of Patent: Aug. 22, 2000

[54] VEHICLE ARTICLE CARRIER AND CLAMPING CROSS BAR THEREFOR

[75] Inventor: Jeffrey M. Aftanas, Sterling Heights, Mich.

[73] Assignee: JAC Products, Inc., Ann Arbor, Mich.

[21] Appl. No.: 09/333,357

[22] Filed: Jun. 15, 1999

[51] Int. Cl.⁷ ...................................................... B60R 9/00
[52] U.S. Cl. .......................... 224/321; 224/309; 224/322; 224/331
[58] Field of Search .................................... 224/321, 322, 224/329, 331, 309, 570

[56] References Cited

U.S. PATENT DOCUMENTS

| | | |
|---|---|---|
| 4,487,348 | 12/1984 | Mareydt . |
| 4,723,696 | 2/1988 | Stichweh et al. . |
| 4,982,886 | 1/1991 | Cucheran . |
| 5,511,708 | 4/1996 | Cronce et al. . |
| 5,573,161 | 11/1996 | Stapleton . |
| 5,730,343 | 3/1998 | Settelmayer . |
| 5,732,863 | 3/1998 | Stapleton . |
| 5,732,864 | 3/1998 | Stapleton . |
| 5,758,810 | 6/1998 | Stapleton . |
| 5,791,536 | 8/1998 | Stapleton . |
| 5,984,155 | 11/1999 | Stapleton ................................ 224/321 |

*Primary Examiner*—Gregory M. Vidovich
*Assistant Examiner*—Maerena N. Brevard
*Attorney, Agent, or Firm*—Harness, Dickey & Pierce, PLC

[57] ABSTRACT

A vehicle article carrier incorporating at least one cross bar having a pair of bracket assemblies at each end. Each bracket assembly includes a fixed jaw and a movable jaw. The fixed jaw includes a keyed recess having an internal shoulder portion and a secondary recess. The movable jaw includes a projecting key having a rib and an arm portion having an enlarged outer end. The projecting key engages within the keyed recess and the secondary recess is used to receive the enlarged outer end of the movable jaw to help locate the jaw in precisely the proper position such that the movable jaw is aligned with the fixed jaw during clamping of the bracket assembly to a side rail. Advantageously, the movable jaw can be rotated into a position to be clamped simply by turning a fastening element which secures the fixed and movable jaws together. The bracket assembly can therefore be secured much more quickly and easily to a side rail and also removed or loosened to allow for repositioning of the cross bar along the side rails.

12 Claims, 3 Drawing Sheets

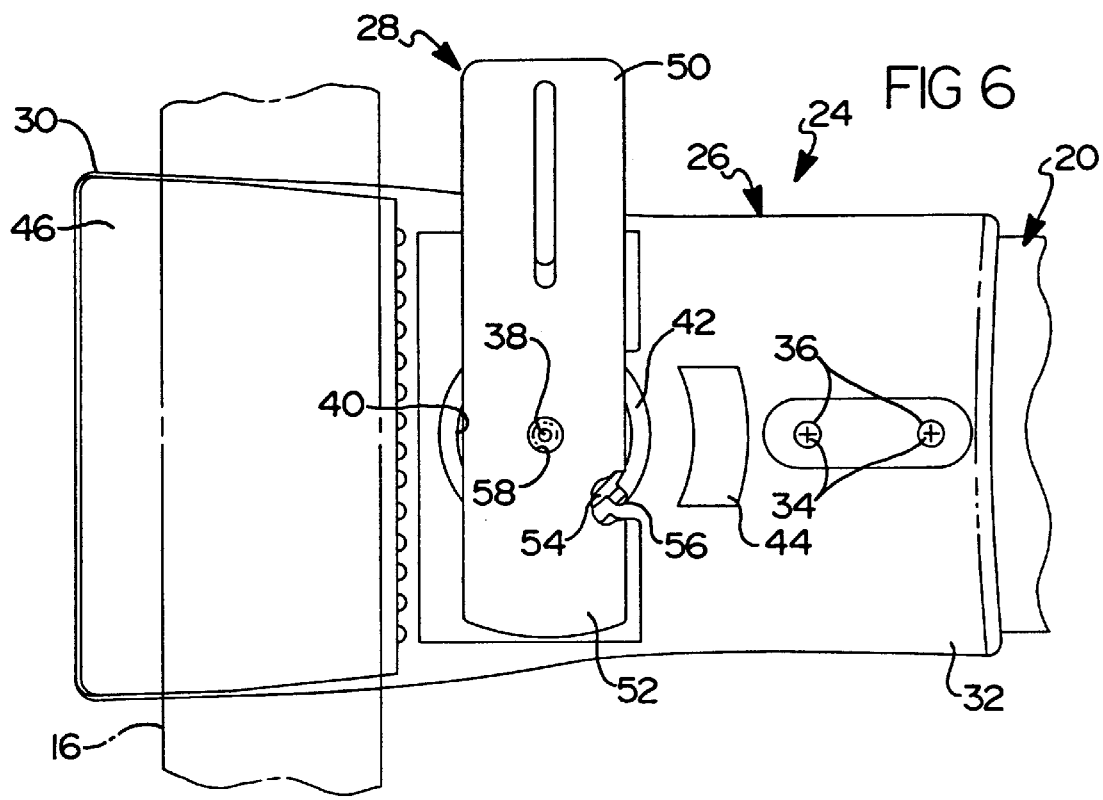
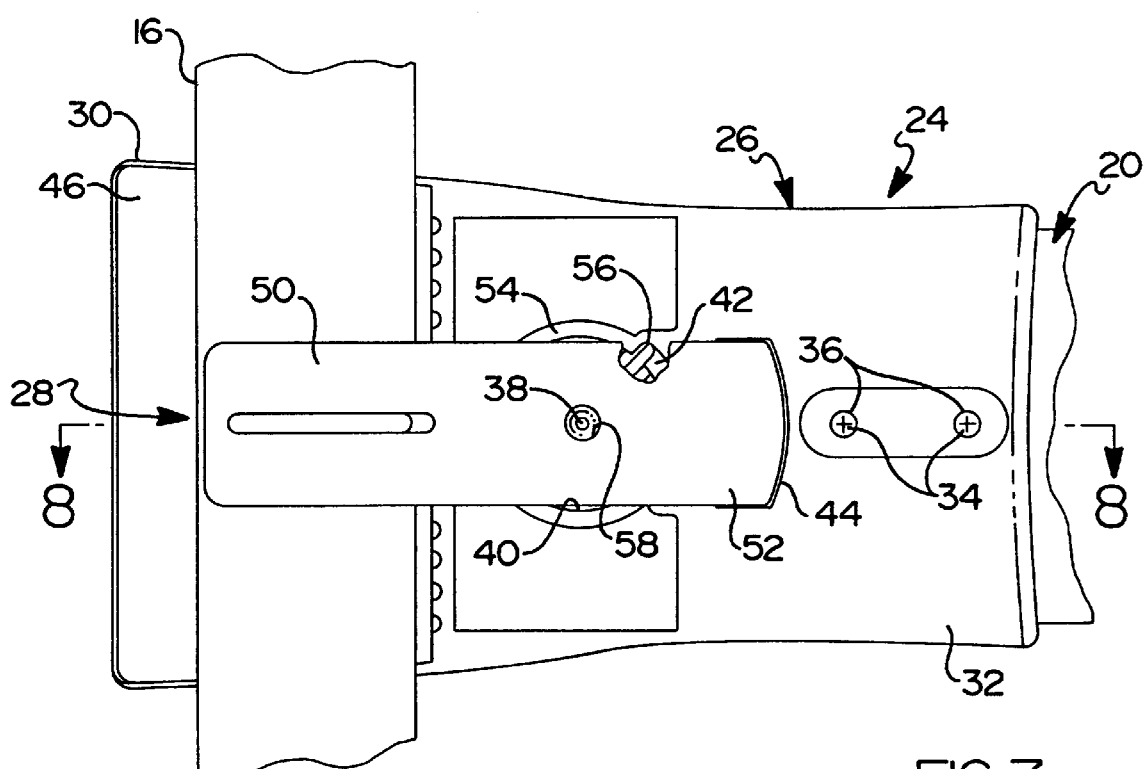

VEHICLE ARTICLE CARRIER AND CLAMPING CROSS BAR THEREFOR

BACKGROUND OF THE INVENTION

1. Technical Field

This invention relates to vehicle article carriers, and more particularly to a vehicle article carrier incorporating a cross bar which includes a pair of bracket assemblies, where each bracket assembly includes a clamping mechanism for clamping onto a portion of an associated side rail of the vehicle article carrier.

2. Discussion

Vehicle article carriers are used in a wide variety of applications to support luggage and other various articles above an outer body surface of a motor vehicle such as a car, sport utility vehicle or truck. Typically, such vehicle article carriers incorporate a pair of side rails which are secured to an outer body surface of the vehicle. The side rails typically include at least a pair of supports which are secured directly to the outer body surface and which serve to position the side rails slightly above the outer body surface. One or more cross bars are also typically included. One of the cross bars may be fixedly secured to the side rails with the other one of the cross bars being adjustably secured such that it can be moved along the side rails and repositioned thereon as needed to suit specific sized articles being carried thereon.

Many such cross bars as described above incorporate some form of bracket assembly for securing the cross bar at its opposite ends to the side rails. Often these bracket assemblies are of complex construction, and often include numerous independent parts. In some instances, the bracket assemblies cannot be removed easily from the side rails without significant disassembly of either the bracket assembly or the side rail. Thus, when the vehicle article carrier will not be used for prolonged periods of time, it is often inconvenient for the vehicle owner to remove the cross bars.

Various pre-existing bracket assemblies for such cross bars often include complex mechanisms which, in some instances, can be affected by the elements such as snow and ice. Often ice and/or snow affects the ability of the bracket assembly to be easily released from the side rails when the cross bar needs to be repositioned along the side rails.

Still another drawback with many pre-existing bracket assemblies is that they are not quickly and easily installed on the side rails. This adds to the labor required to install the side rails either at a factory assembly line or at a dealership, and thus can contribute to increasing the overall cost of the vehicle article carrier.

It is therefor a principal object of the present invention to provide a vehicle article carrier having a cross bar which includes a pair of bracket assemblies, where each bracket assembly may be quickly and easily clamped onto an associated side rail at a desired position on the side rail.

It is another object of the present invention to provide a vehicle article carrier which incorporates a bracket assembly for a cross bar, where the bracket assembly may be pre-positioned in an orientation so as not to interfere with placement of the bracket assembly on an associated side rail, and thereafter quickly clamped into place via a single fastening member.

It is further an object of the present invention to provide a bracket assembly for a cross bar, where the bracket assembly can be quickly and easily unclamped from an associated side rail to enable the cross bar to be completely detached from the side rail with no disassembly of the side rail being required.

SUMMARY OF THE INVENTION

The present invention relates to a vehicle article carrier having at least one adjustable cross bar. The cross bar includes a pair of bracket assemblies at each outermost end thereof. Each bracket assembly includes a fixed jaw and a movable jaw. A single fastening member is used to couple the fixed and movable jaws together.

The fixed jaw includes a keyed recess and the movable jaw includes a projecting key having a rib. The projecting key of the movable jaw and the keyed recess of the fixed jaw cooperate to limit rotational movement of the movable jaw between a first pre-determined position and a second pre-determined position. When placed in the first pre-determined position, the movable jaw is not aligned with the fixed jaw, thereby enabling the fixed jaw to be lowered onto a portion of an associated side rail without interference from the movable jaw. Subsequently, the movable jaw may be moved into alignment with the fixed jaw and the fastener tightened to clamp the two jaws onto the side rail.

In the preferred embodiment, the fixed jaw further includes a secondary recess and the movable jaw includes an arm portion. The fixed recess is used to help locate the movable jaw such that the two jaw portions can then be clamped onto the side rail.

The bracket assembly forms a simple yet effective means for quickly and easily attaching the cross bar to its associated side rails. There is no need for disassembly of the side rail or any portion thereof prior to installing the bracket assembly. When it is desired to remove the cross bar entirely from the side rails, the single fastener associated with each bracket assembly may be adjusted so as to loosen the movable jaw and rotate same to a position which permits the bracket assembly to be simply lifted off of its associated side rail. Readjustment of the cross bar to a different position along the side rails is accomplished simply by loosening the fastener such that the movable jaw is released from clamping engagement with the side rail, and then repositioning the cross bar at the desired position before re-tightening the fastener.

BRIEF DESCRIPTION OF THE DRAWINGS

The various advantages of the present invention will become apparent to one skilled in the art by reading the following specification and subjoined claims and by referencing the following drawings in which:

FIG. 6 is a bottom plan view of the bracket assembly of FIG. 2 but showing the bracket assembly in an unclamped position relative to the side rail;

FIG. 7 is a view of the bracket assembly of FIG. 6 after the movable jaw has been rotated 90° counterclockwise and tightened into clamping engagement with the side rail via the fastener.

DETAILED DESCRIPTION OF THE PREFERRED EMBODIMENTS

Figure 1:
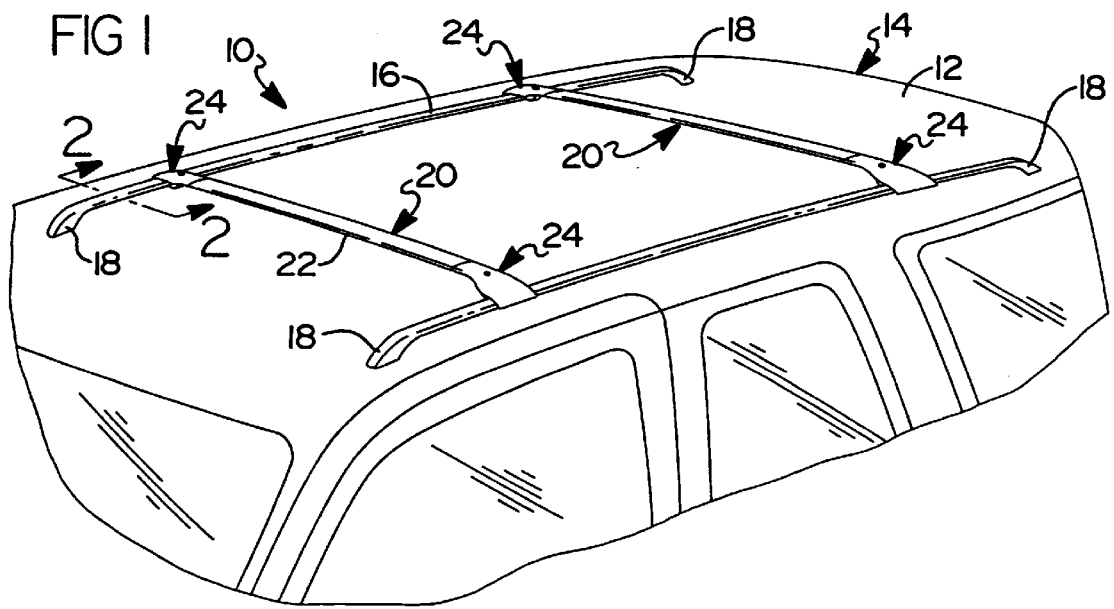
FIG. 1 is a perspective view of a vehicle incorporating a vehicle article carrier in accordance with a preferred embodiment of the present invention.

Referring to FIG. 1, there is shown a vehicle article carrier 10 in accordance with a preferred embodiment of the present invention. The vehicle article carrier 10 is shown attached to an outer body surface 12 of a motor vehicle 14. While the vehicle article carrier 10 is illustrated as being attached to a roof portion of a vehicle, it will be appreciated that the vehicle article carrier 10 could just as readily be secured to a rear deck surface of a vehicle, or potentially even over a truck bed of a pick-up truck.

The vehicle article carrier 10 generally includes a pair of side rails 16 which are supported above the outer body surface 12 by end supports 18. The side rails 16 are secured so as to extend generally parallel to one another along the major longitudinal length of the motor vehicle 14. Preferably, a pair of cross bars 20 each having a length sufficient to span substantially the distance between the side rails 16 are clampingly secured to the side rails. While both cross bars 20 in the drawing of FIG. 1 are illustrated as being adjustable cross bars, it will be appreciated that one may be fixedly secured to the side rails 16 while the other is adjustable along the side rails.

Each side rail 20 includes a central portion 22 and a bracket assembly 24 at each outermost end of the central portion 22. The bracket assemblies 24 enable the cross bar to be quickly clamped to the side rail 16 at a desired position, and loosened if necessary, to enable the cross bars to be repositioned to suit the specific load being carried.

Figure 2:
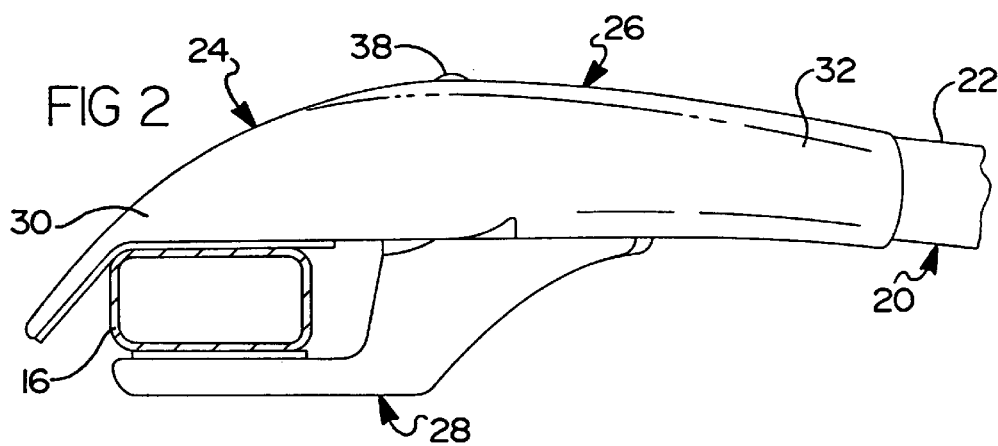
FIG. 2 is a fragmentary view of one end of the cross bar shown in FIG. 1 in accordance with section line 2—2 in FIG. 1 illustrating one bracket assembly clamped to an associated side rail of the vehicle article carrier.
Figure 8:
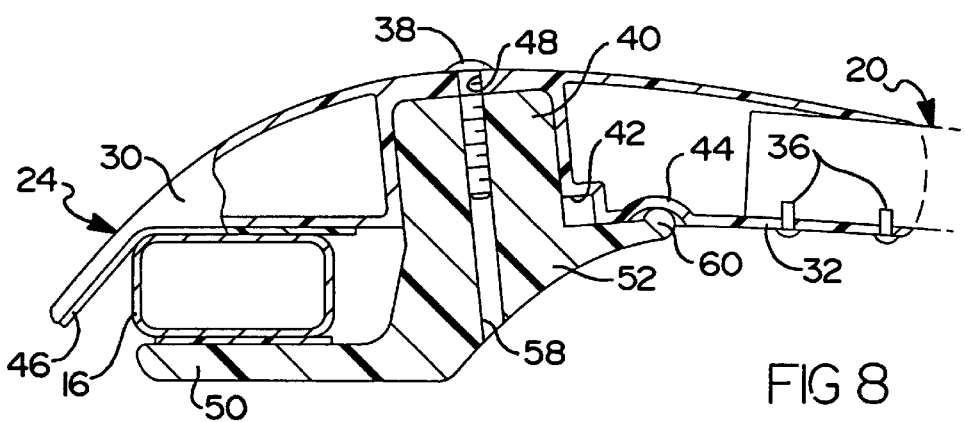
FIG. 8 is a partial cross sectional side view of the fixed jaw and movable jaw taken in accordance with section line 8—8 in FIG. 7 illustrating the engagement of the arm portion of the movable jaw with the secondary recess.

Referring to FIG. 2, each bracket member 24 includes a fixed jaw 26 and a movable jaw 28. The fixed jaw 26 includes a jaw portion 30 and a tubular neck portion 32. The neck portion 32 receives the outermost end of the central portion 22 of the cross bar 20 and is attached via a pair of threaded screws 34 (FIG. 3) extending through openings 36 in the neck portion 32. The fixed and movable jaws 26 and 28, respectively, are held together by a threaded fastener 38 (also shown in FIG. 8) which can be quickly tightened or loosened to either clamp the bracket assembly 24 to its associated side rail 16 or to loosen the movable jaw 28 to allow the cross bar 20 to be repositioned along the side rail 16 as needed.

Figure 3:
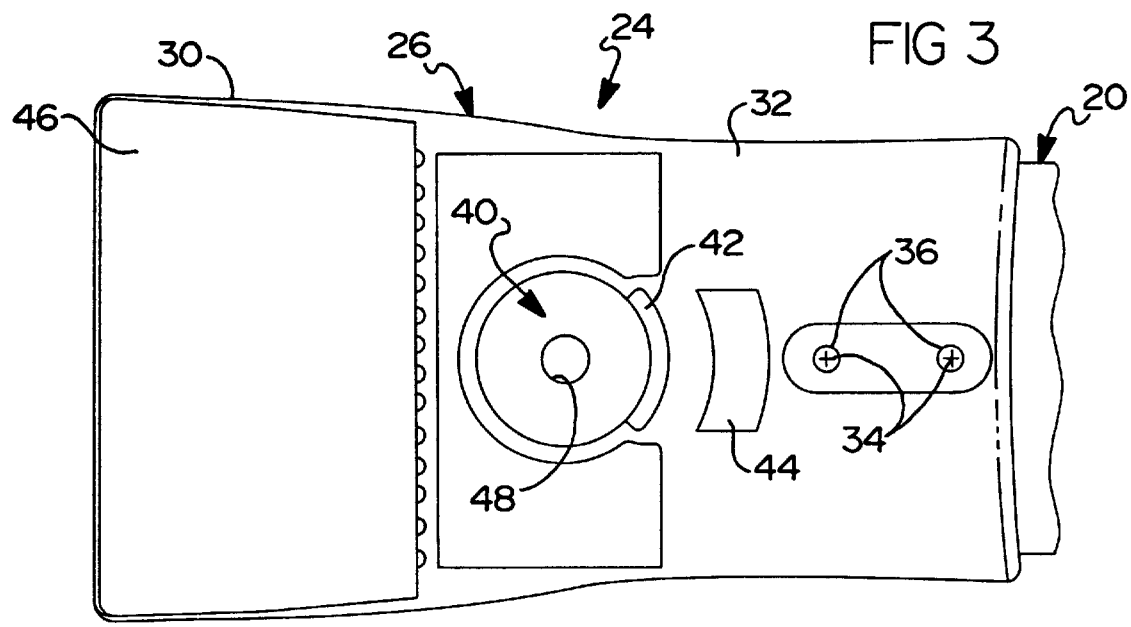
FIG. 3 is a bottom plan view of the fixed jaw of the bracket assembly of FIG. 2, with the movable jaw removed.

Referring specifically to FIG. 3, each bracket assembly 24 includes a keyed recess 40 having an internal shoulder portion 42 and a secondary recess 44 spaced apart from the keyed recess 40. A thin rubber pad or other like protective element 46 is preferably adhered to the jaw portion 30. A bore 48 also extends completely through the fixed jaw 26.

Figure 4:
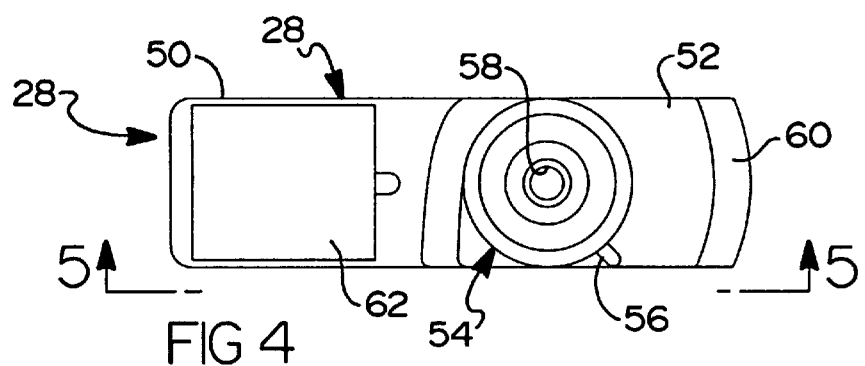
FIG. 4 is a bottom plan view of the movable jaw of the bracket assembly of FIG. 2.
Figure 5:
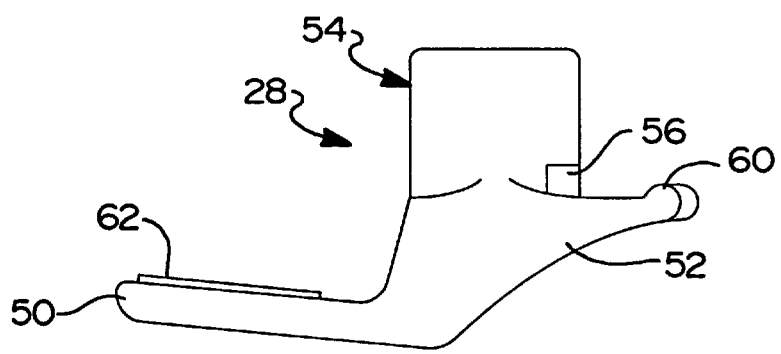
FIG. 5 is a side elevational view of the movable jaw in accordance with directional line 5—5 in FIG. 4.

Referring to FIGS. 4 and 5, the movable jaw 28 can be seen in greater detail. The movable jaw 28 includes a jaw portion 50, an arm portion 52 and a projecting key 54. The projecting key 54 includes a rib 56 which extends therefrom and a threaded aperture 58. The arm portion 52 also includes an enlarged outer end portion 60 as seen particularly well in FIG. 5. A thin rubber or protective pad 62 is also adhered to the jaw portion 50. The protective pads 62 and 46 (shown in FIG. 3) enable the fixed jaw 26 and movable jaw 28 to be clamped to the side rail 16 without scratching or scarring the side rail. The movable jaw 28 is preferably formed as a single piece component from high strength plastic such as ABS plastic through conventional molding techniques.

Similarly, the fixed jaw 26 is also formed as a single piece component from a high strength plastic through conventional molding techniques.

Referring to FIG. 6, it is a principal advantage of the bracket assembly 24 that the bracket assembly can be quickly and easily secured to a side rail 16 by prepositioning the movable jaw 28 clear of the jaw portion 30 of the fixed jaw 26 so that the entire bracket assembly 24 can be simply lowered onto its associated side rail 16. This is accomplished by inserting the projecting key 54 into the keyed recess 40 such that the rib 56 is resting on the internal shoulder portion 42 in the recess 40. The fastener 38 is then engaged in the threaded aperture 58 to hold the movable jaw 28 to the fixed jaw 26.

Referring to FIG. 7, as the fastener 38 is rotated in a tightening direction (i.e. clockwise) the movable jaw 28 moves counterclockwise in the drawing of FIG. 7. The rib 56 rides along the internal shoulder portion 42 until it reaches the opposite end of the shoulder portion. As it approaches the position shown in FIG. 7, the enlarged outer end 60 of the arm portion 52 drops into the circumferential secondary recess 44, which helps to locate and maintain the movable jaw 28 in the position shown in FIG. 7 while the fastener 38 is tightened. The enlarged outer end portion 60 of the arm portion 52 is shown engaged in the secondary recess 44 in FIG. 8.

In this manner the movable jaw 28 can be automatically rotated into position as the individual rotates the fastener 38 in the tightening direction, and automatically located at the proper position to enable the jaws 26 and 28 to clamp onto the side rail 16. This greatly simplifies and expedites the attachment of the cross bar 20 to the side rails 16.

The bracket assembly 24 further eliminates the need for the individual installing the cross bar 20 to manually position the movable jaw 28 in line with the fixed jaw 26 while attempting to tighten the fastener 38. The secondary recess 44 helps to maintain the movable jaw 28 in the required alignment with the fixed jaw 26 so that the jaw 28 makes proper clamping contact with the side rail 16.

The bracket assembly 24 is further relatively simple in construction and does not require numerous independent component parts. The assembly 24 is quickly and easily detached or simply loosened such that the cross bar 20 can be repositioned on the side rails 16 as needed or even removed entirely from the side rails 16 without any disassembly of the side rails 16 or bracket assembly 24.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier apparatus for supporting articles above an outer body surface of a vehicle, said apparatus comprising:

a pair of side rails adapted to be fixedly secured to said outer body surface generally parallel to one another and extending along a major longitudinal length of said vehicle;

at least one cross bar having a length sufficient to span the distance between said side rails and securable to said side rails so as to be supported above said outer body surface;

said cross bar having a bracket assembly at each outermost end thereof for engaging with a portion of an associated one of said side rails;

each said bracket assembly comprising a fixed jaw having a neck portion fixedly attached to an outermost end of said cross bar;

a movable jaw having a projecting key and an arm portion;

a fastener for securing said movable jaw to said fixed jaw;

said fixed jaw having a keyed recess and a secondary recess spaced apart from said keyed recess;

said keyed recess operating to limit rotational movement of said movable jaw between predetermined first and second positions;

wherein said first position defines a position in which said movable jaw is not aligned with said fixed jaw, and said arm portion is displaced from said secondary recess thereby enabling said bracket assembly to be lowered onto said side rail without interference from said movable jaw;

wherein said second position defines a position in which said movable jaw is aligned with said fixed jaw so as to be able to cooperatively clamp onto a portion of an associated said side rail with said fixed jaw; and and wherein said secondary recess is disposed so such that said arm portion engages therewith when said movable jaw is moved into said second position, thereby assisting in locating said movable jaw in said second position.

2. The apparatus of claim 1, wherein said arm portion comprises an enlarged end portion, said enlarged end portion engaging within said secondary recess when said movable jaw is moved into said second position.

3. The apparatus of claim 1, wherein said projecting key comprises a rib; and wherein said keyed recess comprises a circumferential internal shoulder portion that limits rotational movement of said projecting key, and thus said movable jaw between said first and second predetermined positions.

4. The apparatus of claim 3, wherein said secondary recess comprises a circumferential shaped recess.

5. The apparatus of claim 1, wherein said movable jaw includes a threaded bore and said fixed jaw includes an unthreaded bore; and wherein said fastener comprises a threaded screw adapted to extend through said unthreaded bore and into said threaded bore for securing said movable jaw to said fixed jaw.

6. The apparatus of claim 1, wherein said fixed jaw comprises a single piece, integrally formed component having a jaw portion and said neck portion, said neck portion comprising a tubular section adapted to receive said outermost end portion of said cross bar therein.

7. A vehicle article carrier apparatus for supporting articles above an outer body surface of a vehicle, said apparatus comprising:

a pair of side rails adapted to be fixedly secured to said outer body surface generally parallel to one another and extending along a major longitudinal length of said vehicle;

at least one cross bar having a length sufficient to span the distance between said side rails and securable to said side rails so as to be supported above said outer body surface;

said cross bar having a bracket assembly at each outermost end thereof for engaging with a portion of an associated one of said side rails;

each said bracket assembly comprising a fixed jaw having a neck portion fixedly attached to an outermost end of said cross bar;

a movable jaw having a projecting key and an arm portion;

said arm portion including an enlarged end portion;

a fastener for securing said movable jaw to said fixed jaw;

said fixed jaw having a keyed recess and a secondary recess spaced apart from said keyed recess;

said keyed recess including an internal shoulder portion operating to limit rotational movement of said movable jaw between predetermined first and second positions;

wherein said first position defines a position in which said movable jaw is not aligned with said fixed jaw, and said arm portion is displaced from said secondary recess thereby enabling said bracket assembly to be lowered onto said side rail without interference from said movable jaw;

wherein said second position defines a position in which said movable jaw is aligned with said fixed jaw so as to be able to cooperatively clamp onto a portion of an associated said side rail with said fixed jaw; and and wherein said secondary recess is disposed so such that said enlarged end portion of said arm portion engages therewith when said movable jaw is moved into said second position, thereby assisting in locating said movable jaw in said second position.

8. The apparatus of claim 7, wherein said fixed jaw comprises a non-threaded bore and said movable jaw comprises a threaded bore; and wherein said fastener comprises a threaded fastener for securing said movable and said fixed jaws in clamping engagement with said side rail.

9. The apparatus of claim 7, wherein said projecting key comprises a rib adapted to ride on said internal shoulder portion for assisting in limiting rotating movement of said movable jaw between said first and second predetermined positions.

10. A vehicle article carrier apparatus for supporting articles above an outer body surface of a vehicle, said apparatus comprising:

a pair of side rails adapted to be fixedly secured to said outer body surface generally parallel to one another and extending along a major longitudinal length of said vehicle;

a pair of cross bars each having a length sufficient to span the distance between said side rails and securable to said side rails so as to be supported above said outer body surface;

at least one of said cross bars having a bracket assembly at each outermost end thereof for clamping engagement with a portion of an associated one of said side rails;

each said bracket assembly comprising a fixed jaw having a tubular neck portion within which is fixedly received an outermost end of said cross bar;

a movable jaw having a projecting key, a rib extending from said projecting key, and an arm portion;

said arm portion including an enlarged end portion;

a fastener for securing said movable jaw to said fixed jaw;

said fixed jaw having a keyed recess for accepting said projecting key, and a secondary recess spaced apart from said keyed recess;

said keyed recess including an internal shoulder portion upon which said rib rides when said projecting key is disposed in said keyed recess, said rib operating to limit rotational movement of said movable jaw between predetermined first and second positions;

wherein said first position defines a position in which said movable jaw is not aligned with said fixed jaw, and said arm portion is displaced from said secondary recess thereby enabling said bracket assembly to be lowered onto said side rail without interference from said movable jaw;

wherein said second position defines a position in which said movable jaw is aligned with said fixed jaw so as to be able to cooperatively clamp onto a portion of an associated said side rail with said fixed jaw; and and wherein said secondary recess is disposed such that said enlarged end portion of said arm portion engages therewith when said movable jaw is moved into said second position, thereby assisting in locating said movable jaw in said second position.

11. The apparatus of claim 10, wherein said movable jaw comprises a threaded bore and said fixed jaw comprises a non-threaded bore; and wherein said fastener comprises a threaded fastener adapted to extend through said non-threaded bore and engage within said threaded bore to thereby assist in clamping said jaws to said side rail.

12. A cross bar for a vehicle article carrier, wherein said carrier includes a pair of side rails secured to an outer body surface of a vehicle such that said side rails are spaced apart from said outer body surface, said cross bar comprising:

a central portion;

a bracket assembly at each outermost end of said central portion;

each bracket assembly comprising:

a fixed jaw fixedly secured to one of said outermost ends of said central portion, said fixed jaw having a keyed recess and a secondary recess, said keyed recess defining first and second positions;

a movable jaw having a projecting key, said projecting key being operable to engage with said keyed recess such that said movable jaw is only rotationally movable between said first and second positions when said projecting key is engaged with said keyed recess;

said movable jaw further comprising an arm portion operable to engage with said secondary recess as said movable jaw is moved into said second position, to thereby assist in locating said movable jaw in said second position;

and wherein said first position defines a position in which said movable jaw is not aligned with said fixed jaw, thereby enabling said fixed jaw of said cross bar to be lowered onto an associated one of said side rails; and wherein said second position defines a position in which said movable jaw is aligned with said fixed jaw so as to be operable to clamp said onto said associated side rail.

\* \* \* \* \*

UNITED STATES PATENT AND TRADEMARK OFFICE
CERTIFICATE OF CORRECTION

PATENT NO. : 6,105,841
DATED : August 22, 2000
INVENTOR(S) : Jeffrey M. Aftanas

It is certified that error appears in the above-identified patent and that said Letters Patent is hereby corrected as shown below:

Col. 5, line 25, claim 1, delete "and"

Col. 6, line 25, claim 7, delete "and"

Col. 7, line 15, claim 10, delete "and"

Col. 8, line 28, claim 12, after "said" insert --movable jaw--

Signed and Sealed this

First Day of May, 2001

Attest:

NICHOLAS P. GODICI

Attesting Officer       Acting Director of the United States Patent and Trademark Office